US012651330B2

(12) United States Patent
Baert et al.

(10) Patent No.: US 12,651,330 B2
(45) Date of Patent: Jun. 9, 2026

(54) METHOD AND SYSTEM FOR DETERMINING A PATTERN DEVIATION VALUE OF A VISIBLE SURFACE OF A PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 248 days.

(21) Appl. No.: 18/405,599

(22) Filed: Jan. 5, 2024

(65) Prior Publication Data

US 2024/0233114 A1 Jul. 11, 2024

(30) Foreign Application Priority Data

Jan. 6, 2023 (NL) ...................................... 2033917

(51) Int. Cl.

| | |
|---|---|
| ***G06T 7/00*** | (2017.01) |
| ***B41M 5/00*** | (2006.01) |
| ***G06T 7/90*** | (2017.01) |

(52) U.S. Cl.

CPC ........... *G06T 7/001* (2013.01); *B41M 5/0076* (2013.01); *G06T 7/0006* (2013.01); *G06T 7/90* (2017.01); *G06T 2207/10024* (2013.01)

(58) Field of Classification Search

CPC ..... B41F 33/0036; B41M 5/0076; G01J 3/46; G01N 21/251; G01N 21/8806;

(Continued)

(56) References Cited

U.S. PATENT DOCUMENTS

| | | | | |
|---|---|---|---|---|
| 6,456,733 B1 * | 9/2002 | Miyauchi | .................. | G01J 3/46<br>382/100 |
| 2004/0156630 A1 * | 8/2004 | Tsukamoto | ......... | B41F 33/0036<br>396/661 |

(Continued)

FOREIGN PATENT DOCUMENTS

| | | |
|---|---|---|
| EP | 3961166 A1 | 3/2022 |
| JP | 11271237 | 5/1999 |
| KR | 20160019890 A | 2/2016 |

OTHER PUBLICATIONS

Ivanovici et al. "Reference-based color texture digitization and analysis of wooden surfaces." 2017 International Conference on Optimization of Electrical and Electronic Equipment (OPTIM) & 2017 Intl Aegean Conference on Electrical Machines and Power Electronics (ACEMP). IEEE, 2017. (Year: 2017).*

(Continued)

*Primary Examiner* — Katrina R Fujita

(74) *Attorney, Agent, or Firm* — Heslin Rothenberg Farley & Mesiti P.C.

(57) ABSTRACT

The invention relates to a method and system for determining a pattern deviation value of a top surface of a panel, in particular a top surface of a floor panel or wall panel. The method and system enable the calculation of a pattern deviation value based upon a determined pattern value and the at least one selected standard pattern value.

24 Claims, 4 Drawing Sheets

(58) Field of Classification Search
CPC ..... G01N 21/95607; G01N 2021/8416; G01N 2021/8845; G01N 2021/8887; G01N 2201/0627; G06T 7/0004; G06T 7/0006; G06T 7/001; G06T 7/90; G06T 2207/10024; G06T 2207/30168; G06V 10/26; G06V 10/28; G06V 10/56; G06V 10/758
See application file for complete search history.

(56) References Cited

U.S. PATENT DOCUMENTS

| | | | | |
|---|---|---|---|---|
| 2019/0172228 | A1* | 6/2019 | Steenhoek | G06T 7/33 |
| 2019/0228521 | A1* | 7/2019 | Ohama | G01N 21/8851 |
| 2019/0284819 | A1 | 9/2019 | Pervan et al. | |
| 2021/0245493 | A1* | 8/2021 | Lehnhoff | H04N 1/6036 |
| 2021/0256289 | A1* | 8/2021 | Kumagai | G06V 10/761 |
| 2021/0354502 | A1* | 11/2021 | Mahy | G06T 7/0004 |
| 2023/0322008 | A1* | 10/2023 | Dicke | G01J 3/2823<br>347/14 |
| 2024/0007581 | A1* | 1/2024 | Dicke | H04N 1/6097 |
| 2025/0271304 | A1* | 8/2025 | Steenhoek | H04N 1/6008 |

OTHER PUBLICATIONS

Ivana Tomic et al: “Artificial neural networks for optimising camera-based colour measurements of prints enhanced with pearlescent pigments”, Coloration Technology, Apr. 22, 2018; pp. 364-372.

* cited by examiner

METHOD AND SYSTEM FOR DETERMINING A PATTERN DEVIATION VALUE OF A VISIBLE SURFACE OF A PANEL

CROSS REFERENCE TO RELATED APPLICATIONS

This application claims priority under 35 U.S.C. § 119 to Netherland Patent Application No. NL2033917 filed on Jan. 6, 2023, which is incorporated herein by reference in its entirety.

FIELD OF THE INVENTION

The present invention relates to a method for determining a pattern deviation value of a top surface of a panel, and to a system for determining a pattern deviation value of a top surface of a panel.

BACKGROUND

Demands for industrial production of decorative flooring, wall, or ceiling panels are stringent nowadays. On the one hand production speed of extruded laminated flooring panels should be sufficiently high to reduce operating costs, while on the other hand, the produced panels should be of sufficient quality. A balance must be struck between these contradicting demands.

In general, qualitative products and production processes show small variance in parameters. However, variance in parameters of these products and processes is present, and can have multiple causes. For example, as with any industrial production process, machine parts need to be replaced over time, as they wear out. This implies that the conditions wherein panels are produced are not constant over time. In particular when there is a downtime of a panel production line, and parts need to be replaced, or raw materials need to be fed to the production line. Slight differences may exist between replacement parts and the worn parts. In addition, new raw material may have slightly different characteristics from the old, previously used materials. The changes in the environment such as relative humidity and temperature also cause an impact on the production parameters. This inevitably leads to variations in panel quality, in particular between batches.

For decorative flooring, wall, or ceiling panels, a visually pleasing pattern is important for customers. In particular, uniformity of patterns on the top surface of panels is an important quality parameter. Minute colour differences between batches or within batches can already be visible to the naked eye when such panels are assembled into a floor covering. It is therefore important to not only control the colouring and patterning of the panel during the production process, but also to measure the colour and patterning of produced panels in order to determine whether or not their colour and patterning are within allowable tolerances.

One way of assessing whether or not the colour of produced panels is within allowable tolerances, involves measuring a part of the top surface of the panel using a handheld colorimeter. Measuring via a colorimeter can be executed in a short amount of time. However, only a very limited surface area, up to one square centimetre, can be measured at one time. Therefore, the resulting colour value is highly dependent on the location at the surface of the panel, where the measurement is executed. Measured colour values of panels having a complex pattern, such as a wood grain or stone, are in particular dependent on the location where the measurement takes place. As such, measuring colour values of panels using handheld colorimeters does not provide sufficiently accurate information about the visual quality of panels nor information about the visual similarity of panels.

Another assessment of the colour is visual inspection by the naked eye. This involves thorough training of personnel, before they are capable of reliable visual inspection of panels. Although this method allows for a measurement of the top surface of a panel as a whole, it also has several disadvantages. A first disadvantage is that the measurement results vary between trained personnel. There is no stable or fixed threshold value that, when crossed, would lead to rejection of the panel. This threshold value may vary in time and is dependent on the person itself and his or her current condition. Another disadvantage is that lighting conditions under which the measurement takes place, may vary, depending on the time and location where the measurement is executed. Furthermore, any measurement is topical in time and place, and is not representative for the entire product or batch and does not ensure the entire batch of produced material is consistent.

Metamerism is another problem that must be recognised and accounted for in industrial colour matching. Decorative panels can have colours that are metamers. In this case, the panels have different spectral power distributions, or different proportions of energy at certain wavelengths, but their colours are perceived as matching each other. Each type of cone in the human eye is sensitive not only to a single wavelength, but rather to a broad range of wavelengths. Metamerism can occur due to the eye of an observer responding to the total energy of a larger range of wavelengths. In this way, different lighting combinations with various wavelengths can create the same receptor response and thus the same perception of colour. This means that the decorative panel might look alike under one source of light but look different in a different source of light.

Hence, the goal of the present invention is to increase the accuracy and reliability of measurements of visual quality of panels.

SUMMARY

To solve this problem, in a first aspect the present invention provides a method for determining a pattern deviation value of a top surface of a panel, in particular a top surface of a floor panel or wall panel, comprising the steps of: a) providing at least one panel having a top surface; b) providing at least one database comprising at least one standard pattern value of the floor panel, in particular comprising a plurality of standard pattern values of the panel; c) selecting at least one standard pattern value from the database; d) capturing at least one image of at least part of the panel, in particular part of the top surface of the panel; e) determining at least one pattern value of at least part of the image; and f) calculating a pattern deviation value based upon the at least one pattern value determined during step e) and the at least one standard pattern value selected during step c). Preferably, the method is a computer-implemented method. On the one hand, this allows a relatively large part of the panel, or the top surface of the panel as a whole to be captured by an image capturing device, such as a camera. While on the other hand, measurement variance, caused by human visual inspection, is absent.

The captured image can subsequently be converted to a pattern value or a colour value, which can in turn be compared to a database containing standard pattern values. These standard pattern values are set-point values and as such represent the desired pattern colour value of the panel.

Numerous ways of calculating pattern deviation values are envisageable. A standard pattern value could for example be a matrix of values, wherein each value represents a pixel of a desired pattern. Subsequently, a captured image, which is, or can be represented as a matrix of values, can be compared to the standard pattern value. The differences between each value at the same position in both matrices can be averaged into a single pattern deviation value. Another option is that the standard pattern value is a single value, representing an average of colours of a desired pattern of a panel. Another single value could be inferred from the captured image and compared to this standard pattern value, in order to calculate a pattern deviation value. Yet another option would be to calculate a pattern value of a captured image based on pixels exceeding a given darkness or lightness and comparing these to their corresponding standard pattern values.

The method as outlined above solves the problem of metamerism that occurs when relying on human visual perception. In particular, when an image capturing device is used, the determination of the pattern value is no longer reliant on cones in the human eye. As decorative panels might look alike under one source of light but look different in a different source of light, it is further conceivable that during step d) different lighting situations are created to imitate these differences in colour under different light sources.

Preferably, the panel provided during step a) is held in the same position with respect to an image capturing device, by for example a holder, during at least step d). This ensures that images captured during step d) are captured from the same position, and pattern values can be generated more consistently for a plurality of panels.

A pattern value or colour value may be an average colour value of all the pixel colour values in the image data. Such a value can be determined by the sum of all pixels in an image divided by the total number of pixels. In some cases, the image may be first converted to a grayscale image whereafter the mean of the gray levels across the image is determined. However, the gray levels are scalar values as compared with the original colour data which may have the form of a three-dimensional vector. In other embodiments, the colour of the decorative panel is defined by the at least one dominant colour rather than the average colour of the image data.

A pattern value or colour value of an image may be defined by n dominant colours where n is an integer >=1, preferably >=3, and more preferably >=5. The total percentage of the n dominant colours in the image can be used to assess the colour variation of the image. In the subject application, a dominant colour is the colour most prevalent in a surface area or image thereof. A dominant colour region can therefore be a specific part of a surface of a panel, wherein the dominant colour is prevalent. Another option is that the dominant colour region is scattered and quite evenly distributed over the panel surface. As such, the dominant colour region could be a plurality of very small and potentially irregularly shaped regions. The pattern value or colour value may be defined by the colour value of each dominant colour and the ratio of the colour present in the captured image expressed in a percentage.

However, it is preferred that the average colour and the dominant colour are both determined for assessing the visual quality of the decorative panel. Vector quantization, eigenvalues/eigenvectors, clustering, or k-means clustering can be used wherein the average colour value of the image data is calculated and the at least one dominant colour in the image data is determined.

Within the subject application, standard pattern values, pattern values, standard colour values and colour values can thus be single numbers, vectors, matrices or even other higher dimensional representations of values.

Preferably, the method further comprising the step of rejecting the panel if the pattern deviation value exceeds a threshold value. This enables a very quick, robust, and accurate decision on whether or not the panel is of a sufficient visual quality to be delivered to customers. Moreover, this allows automated separation of panels falling within required specifications from panels exceeding these specifications. Depending on the type of customers and the desired level of quality, this threshold value can be set higher or lower.

The threshold value can be a plurality of threshold values represented in a vector, matrix, or other higher dimensional representation. One threshold value could for example be a value that represents a deviation threshold for the average colour of the entire panel, while another threshold value could be indicative for a lightness of the entire panel, or a specific part thereof.

The at least one pattern deviation value may be a colour deviation value representable in a colour space selected form HSV (hue, saturation, lightness), HSL (hue, saturation, value), CMY (cyan, magenta, yellow), CMYK (cyan, magenta, yellow, and key), CRYK (cyan, red, yellow, and key), CIELAB (International Commission on Illumination L*a*b), and RGB (red, green, blue). Depending on the colours and patterns of a desired panel, the preferred colour spaces in which to express measured colour, brightness, and/or saturation may differ.

For example, the plurality of standard pattern values and the at least one pattern value may each comprise an L*-value, an a*-value, and/or a b*-value, wherein L* is a lightness value, ranging from 0-100, a* is an unbounded red-green value, and b* is an unbounded blue-yellow value, wherein a* and b* preferably range from −128-127.

A colour difference can be calculated with the following formula:

$$\Delta E^* = \sqrt{(L_2^* - L_1^*)^2 + (L_2^* - L_1^*)^2 + (L_2^* - L_1^*)^2}$$

wherein:

$$\text{Color1} = (L_1^*, a_1^*, b_1^*)$$

$$\text{Color2} = (L_2^*, a_2^*, b_2^*)$$

ΔE* is an example of a geometric mean difference value. The formula can be used to calculate such a geometric mean difference value.

Preferably, in step d) at least 50% of the top surface of the panel is captured, such as at least 55%, 60%, or 65%. More preferably, in step d) at least 75% of the top surface of the panel is captured, such as at least 80% or 85%. Even more preferably, in step d) at least 90% of the top surface of the panel is captured, such as 92%, 94%, 95%, 96%, 97%, 98%, 99%, or substantially 100%. This allows to increase accuracy of inferred colour and/or pattern values from the captured image. Notably, colour values and pattern values tend to average out when the surface area increases. Capturing a relatively large surface area of the panel in a single image thus results in a reliable and accurate determination of the pattern value, and as a consequence, the pattern deviation value can be accurately calculated.

According to ISO 2859, it is conceivable that a pixel size number and a corresponding sample size of random pixels to be sampled is assigned to a captured image. Subsequently, the n dominant colours and/or average colour representative of the captured image is calculated. As an example, an image size of 6000 pixels will have a sample size of at least 200 pixels which can be utilized to calculate n dominant colours and/or average colour values.

In step e), it is conceivable that, at most 50% of the captured image may be used to determine the at least one pattern value, preferably at most 25%, more preferably at most 10%, most preferably at most 5%. This considerably decreases calculation time required for calculating the pattern deviation value, as the amount of data to process in order to determine the pattern value, is much smaller when compared to using all data of the captured image.

In an embodiment, the method comprises the step of determining at least one dominant colour of the image captured during step d), and wherein the at least one pattern value determined during step e) comprises a colour value of the at least one dominant colour region. The ratio of the dominant colour value(s) may be assessed during this step. This allows the most notable and striking part of the panel to fall within the required specifications, while the less obvious and less notable parts of the panel have more leeway with regard to falling within desired specifications. In line with the above, the at least one pattern value determined during step e) comprises an average colour value, at least one dominant colour value, and/or a ratio of n dominant colour values.

Preferably, the pattern deviation value is a geometric mean difference value. Additionally or alternatively, the threshold value can be 1, preferably 0.75, more preferably 0.5. This threshold value allows a good separation between high visual quality panels, and panels of lower visual quality.

In another embodiment, in step d) the top surface of the panel may be illuminated with blue light, red light, or a combination thereof. Additionally or alternatively, the blue light may have a wavelength between 420 and 540 nm, such as 440-520 nm, 460-500 nm, 470-490 nm, or about 480 nm, and the red light may have a wavelength between 600 and 770 nm, such as 620-750 nm, 620-720 nm, 640-720 nm, 660-720 nm, 680-720 nm, or about 700 nm. In particular, the combination of blue and red light exaggerates visual defects in the captured panel. This allows to discard panels having only a very slight off colour or pattern deviation. As such, this allows to obtain very uniformly coloured and patterned panels.

In step d) at least one image of a digitally printed surface of the panel may be captured. A digitally printed surface of the panel can be consistently captured and any required adjustments to the printer can be made based on the captured image. In particular the method may be performed at a plurality of time intervals during production of a plurality of panels; and wherein at each time interval the method is performed for at least one panel. This allows adjustment of the printing process of the panel during production of a batch of panels, as soon as a deviation in the colour and/or the pattern of produced panels is observed.

The method may also be performed during application of a design on at least one panel surface, during a lamination process, and/or during a finishing process. Advantageously, the calculated pattern deviation value can be fed back to a printer and a pattern printed by the printer on a panel can be adjusted based on the calculated pattern deviation value. This process can be performed during production of a batch of panels.

In a second aspect, the present invention relates to a system for determining a pattern deviation value of a top surface of a panel, in particular via the method outlined above, comprising: at least one image capturing device; at least one database comprising a plurality of standard pattern values of the panel; and at least one processor configured to select at least one standard pattern value from the database and to determine at least one pattern value of at least part of an image obtainable by the at least one image capturing device, and subsequently calculating a pattern deviation value based upon the at least one determined pattern value and the at least one selected standard pattern value. This system enables the user to capture a relatively large part of the top surface of a panel in a single image. As such, pattern values and/or colour values can be determined using a relatively large percentage of the top surface area of the panel, resulting in a more accurate assessment of the visual quality of the panel. The system allows to accurately assess whether the pattern and colour of the panel are as intended. Variance in assessing the visual quality of panels due to human visual inspection is eliminated. As such, the system represents a robust and accurate solution for assessing visual quality of panels, and visual uniformity between panels.

Preferably, the at least one image capturing device is a camera. Preferably, the processor is connected to the image capturing device, such that a digital image can be stored and processed into at least one pattern value. The image capturing device may be arranged for acquiring an image of a decorative top surface of a panel, a film layer, or any other surface of interest.

The image capturing device may comprise a camera, photodiodes, video camera or video capturing device, image or video scanner, image or video sensor, colour sensor, area scan cameras, flatbed scanners, scanning devices, complementary metal oxide semiconductor (CMOS) sensors, charge coupled devices (CCD), or any means of acquiring image or video data. The image capturing device may be placed in an enclosure, chassis, chamber, or housing configured to avoid light reflections, unwanted effects from external light sources, or any possible contamination in the workspace such as dusts, chemical, or water splashes.

The image can be one or more of still, live, or real-time images captured during a specific time or at predetermined time intervals. Preferably, the processor can acquire image data of an image captured from any angle provided that the image data comprises the surface of the decorative top surface of a panel, a film layer, or any other surface of interest. The image capturing device may be capable of capturing images having a resolution in the range of 14192×10640 up to 28384×21280 (4× pixel shift). By using an ultra-high resolution, the processor can easily lower the resolution when needed, while having access to very accurate and detailed information about pattern values and colour values.

The processor can be any microcontroller, microprocessor, central processing unit (CPU), graphics processing unit (GPU), tensor processing unit (TPU), field programmable gate arrays (FPGA), or any hardware device capable of processing data, issuing instructions, or executing calculations. Preferably, the processing module can use advanced processing means such as intelligent systems, predictive algorithms, artificial neural networks, fuzzy logic, genetic algorithms, machine learning, deep learning, or combinations thereof. This allows the processing module to be trainable or teachable to perform a desired algorithm or intelligent system to perform image processing techniques, processes, or analyses.

The database may be stored on a data storage device comprising a read only memory (ROM), random access memory (RAM), magnetic disk storage media, hard disk storage, optical storage media, flash memory devices, universal serial bus (USB) drive, secure digital (SD) card, memory chip, or any combination thereof.

In another embodiment, the system comprises at least one panel holder for receiving at least part of at least one floor panel or wall panel. The panel holder allows for accurate positioning of the panel prior to capturing an image. This ensures that an image is taken from the same location for every panel, wherein the captured part of the panel is the same for each panel. Additionally, or alternatively, the image capturing device may be configured to detect positioning indices or markings on the floor panel. These positioning indices or markings may be printed and ensure accurate positioning prior to image acquisition.

In another preferred embodiment, the system may comprise positioning locking mechanisms to avoid positioning errors. The positioning locking mechanisms may comprise motion detectors, multi-axis gimbal stabilizers, axis stabilizers, stability adjusters, gyroscopes, tilt sensors, angle sensors, or other similar devices to ensure the accurate positioning of the system, and in particular the image capturing device, relative to the panel.

In line therewith, the system may comprise at least one controller connected to the at least one image capturing device, wherein the at least one controller is configured to position the at least one image capturing device relative to the at least one panel holder. This allows to correct for any accidental dislocation of the panel relative to the image capturing device.

Preferably, the system comprises a light source for illuminating at least part of the panel. This light source preferably adheres to either ISO 3664:2009, ASTM D1729-2016, SAE J361, and BS-950 Part 2. The light source may be or emit light of the following types: D75 north sky daylight (7500K), D65 average daylight (6500K), D50 noon sky daylight (5000K), ultraviolet, fluorescent light, cool white fluorescent (CWF), warm white fluorescent (WWF), TL84, TL830, TL835, SPX35, tri-phosphor fluorescent, Ultralume 30 & 35, light emitting diodes (LED), neon lights, incandescent bulbs, Illuminant A, tungsten, tungsten halogen, or Horizon.

Preferably, the light source comprises a plurality of light sources, preferably wherein the plurality of light sources is able to emit light with different wavelengths. Most preferably, the light source is a colour-changing light emitting diode (LED) comprising at least two different LEDs capable of emitting light having a wavelength in the visible spectrum. The LEDs may emit light having a wavelength in any one of the ranges 420-500 nm, 500-570 nm, 570-620 nm, or 620-750 nm. The LEDs may for example emit light having a wavelength in any one of the ranges 460-500 nm (blue light), 500-570 nm (green light), or 620-720 nm (red light). Each LED may emit light having a different wavelength. The LEDs can preferably emit light having a wavelength between 400-720 nm, such as 440-680 nm, 460-660 nm, or 480-640 nm. The LEDs may have a dedicated microcontroller to adjust the wavelength of each of the LED in order to achieve a certain colour when the emitted light of multiple LEDs is combined. For example, a first LED can emit light with a wavelength of 483 nm which has a greenish blue colour, while a second LED can emit an orange coloured light having a wavelength of 595 nm. The combination of these lights will result in a white light which can be used for illuminating the surface of a decorative panel. In particular, the combination of blue and red light is used to avoid reflection on the surface of the decorative panel when acquiring the image data with the image capturing device.

In another embodiment, the light source comprises at least two light sources, wherein one of the two light sources is able to emit blue light, and wherein one of the two light sources is able to emit red light. Additionally or alternatively, the blue light may have a wavelength between 420 and 540 nm, such as 440-520 nm, 460-500 nm, 470-490 nm, or about 480 nm, and the red light may have a wavelength between 600 and 770 nm, such as 620-750 nm, 620-720 nm, 640-720 nm, 660-720 nm, 680-720 nm, or about 700 nm.

It is further conceivable that the system can assess the pattern deviation on the top surface of the panel due to metamerism. The combination of red, green, and blue lights allows the simulation of light sources that may be illuminated on the top surface of the panel. Simulated light sources may be selected from natural and artificial light, which can be selected from warm fluorescent, standard fluorescent, glow light fluorescent, cool white fluorescent, and incandescent, among others.

Any colour or pattern deviation due to metamerism on the surface of the panels can be subsequently assessed against the at least one pattern deviation value of at least part of the image of the top surface of the panel.

This ensures the visual quality and uniformity of the patterns on the top surface of panels against various light sources.

In another embodiment, a position of the light source relative to the at least one image capturing device is adjustable. Advantageously, this allows to minimize reflections of light from the light source directed at the panel. In addition, it allows to optimally position the light source relative to the panel, which can be advantageous to illuminate the whole panel, in particular when a surface structure is present that may result in shadows being cast over the surface of the panel.

Preferably, the system comprises a motion detector for detecting positional changes of the at least one image capturing device relative to the panel and/or the at least one panel holder. The processor may be further configured to perform at least one process comprising a pattern finding process, colour matching, image or colour segmentation process, edge detection process, or combinations thereof.

The panel holder may be placed in-line and downstream of a panel lamination system, a printing system, a finishing system, or a coating system.

In a third aspect, the present invention relates to a panel, in particular a floor panel or wall panel, comprising a pattern deviation value below 10%, preferably below 5%, calculated via the method as described herein and/or determined via the system as described herein.

In line with the third aspect, in a fourth aspect, the present invention relates to a plurality of panels, in particular a plurality of floor panels and/or wall panels, wherein each panel of the plurality of panels comprises a pattern deviation value preferably below 10%, more preferably below 5%, calculated via the method as described herein and/or determined via the system as described herein. In particular the system allows for obtaining a batch, or a plurality of panels, all having a very small pattern deviation value. A system as described herein allows for controlling colour and obtaining pattern deviation values below 10% or even below 5%.

Preferably, each panel is digitally printed. Due to the consistency of digital printing, panels comprising pattern deviation values below 10%, below 5%, or below 3% can be obtained.

BRIEF DESCRIPTION OF THE DRAWINGS

The invention will now be elucidated into more detail with reference to the following non-limitative figures. Herein show.

DETAILED DESCRIPTION

Figure 1:
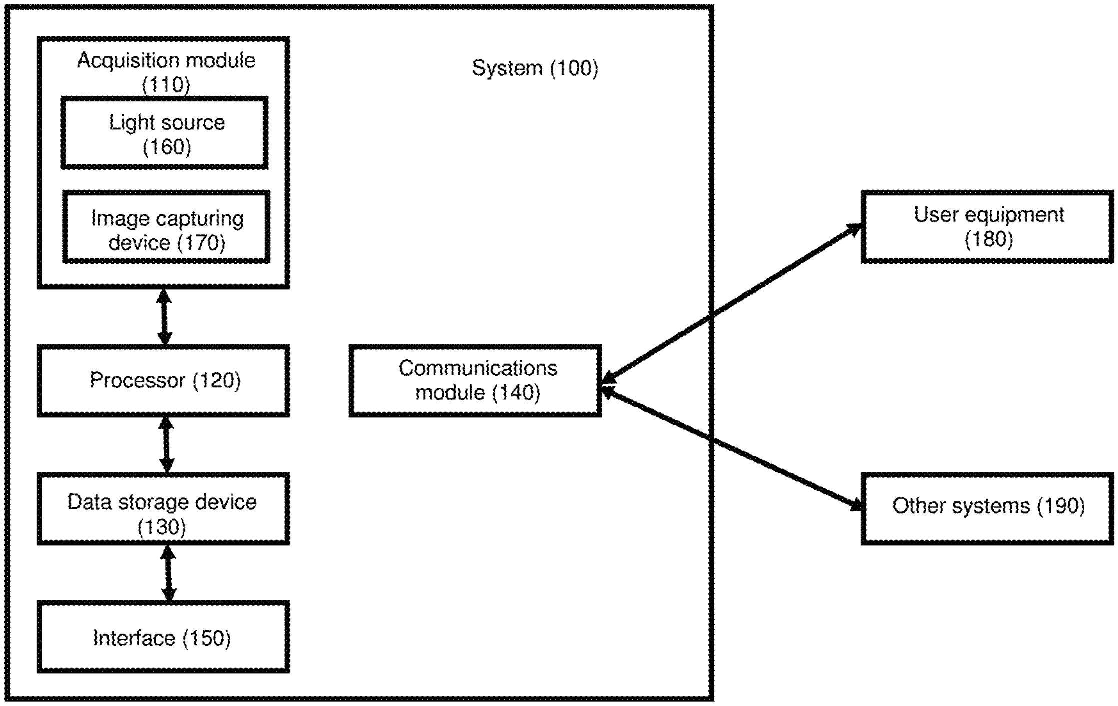
FIG. 1 is a schematic overview of a system for determining a pattern deviation value of a top surface of a panel according to the present invention.

FIG. 1 shows a system for determining a pattern deviation value of a top surface of a decorative panel. The system 100 comprises an acquisition module 110, a processor 120, a data storage device 130, a communications module 140, and an interface 150. The acquisition module 110 comprises a light source 160 and an image capturing device 170.

The light source 160 is capable of illuminating a top surface of a decorative panel. The image capturing device 170 allows to acquire data in the form of an image pertaining to the decorative panel. The acquisition module 110 encloses the light source 160 and the image capturing device 170 in a housing, and is connected to the processor 120. The acquisition module 110 is capable of acquiring and sending image data to the processor 120. Optionally, the acquisition module is equipped with additional sensors capable of measuring other physical or chemical properties of the panel such as surface temperature, gloss level, matte level, opacity, light reflection value, surface roughness, transparency, colour values, stain presence, or combinations thereof.

The processor 120 performs the necessary algorithms or image processing techniques to enable accurate determination of one or more pattern values from the image. These algorithms or image processing techniques may include error determination, error correction, noise filtering, linear filtering, image restoration, independent component analysis, pixelation, template matching, image generation technique, or combinations thereof. For example, the processor 120 may analyse and identify portions or areas of the acquired image data with noise that can be due to gloss or matte levels in the acquired data. In such cases, the processor 120 may alert the user of the possible issue or even perform corrective actions such as adjustment of the orientation of the image capturing device 170 relative to the panel or the degree of illumination or operating wavelength of the light source 160. The processor 120 can also send or transmit processed data to other systems 190 via a communications module 140. The processor 120 can also save the processed data to at least one data storage device 130 at any specified or predetermined time. The data storage device 130 is arranged to store the database required for determining a pattern deviation value. Data stored on the data storage device 130 can be sent to one or more interfaces 150 for user access. Preferably, the system 100 can communicate with one or more user equipment 180 and/or other systems 190 via the communications module 140. The user equipment 180 can be a computer, tablet, smartphone, or any handheld device.

The communications module 140 enables communication between the system 100 and user equipment 180 and/or other systems 190. Data can be transferred via a wired or wireless link with the system 100. The communications module 140 can be any transmitter, receiver, or transceiver used for industrial communications protocols such as but is not limited to Hypertext Transfer Protocol (HTTP) Hypertext Transfer Protocol Secure(HTTPS), Message Queuing Telemetry Transport (MQTT), Master-Slave/Client-Server communication (Modbus RTU, Modbus TCP/IP), RS-232 & RS-485, 12C, GPRS, BACnet, BACnet/IP, BACnet/IP BBMD, BACnet MS/TP, CC-Link IE SLMP, Data Highway Plus DH+, DeviceNet, Ethernet/IP, EtherCAT, Modbus TCP/IP, Profibus, Profinet, long range (LoRa) modulation, radio frequency (RF), wireless fidelity (Wi-Fi), Bluetooth, infrared, near field communication (NFC), visible light communication, microwave communication, satellite communication, Li-Fi, WiMax, ZigBee, cellular communication, code division multiple access (CDMA), 2G, global system for mobiles (GSM), 3G, 4G, long term evolution (LTE), long term evolution advanced (LTE-advanced), 5G, 5.5G, 6G, any other wireless communications protocol, or a combination of thereof.

The interface 150 can be an input device, an input/output device or a display/input device which may include simple analog buttons, a system of switches, digital display, liquid crystal display (LCD), light emitting diode (LED) display, or a multi-point touch input screen. The interface 150 can be any device capable of providing interaction with a user such that the user can input data, enter a command, transfer file/s, control any other device connected to the interface 150, view data or any stored file, make amendments or program the system 100.

The system 100 for determining a pattern deviation value of a top surface of a panel is preferably deployed at multiple locations in a panel production line to ensure that the visual quality of the decorative panel is within acceptable parameters. The location can be located downstream of a: I. decorative paper or film printing system, II. hot pressing or thermal lamination system, III. curing or UV coating system, and IV. digital printing system. It is also conceivable that the system 100 is deployed in any advantageous location as desired by the user.

Figure 2:
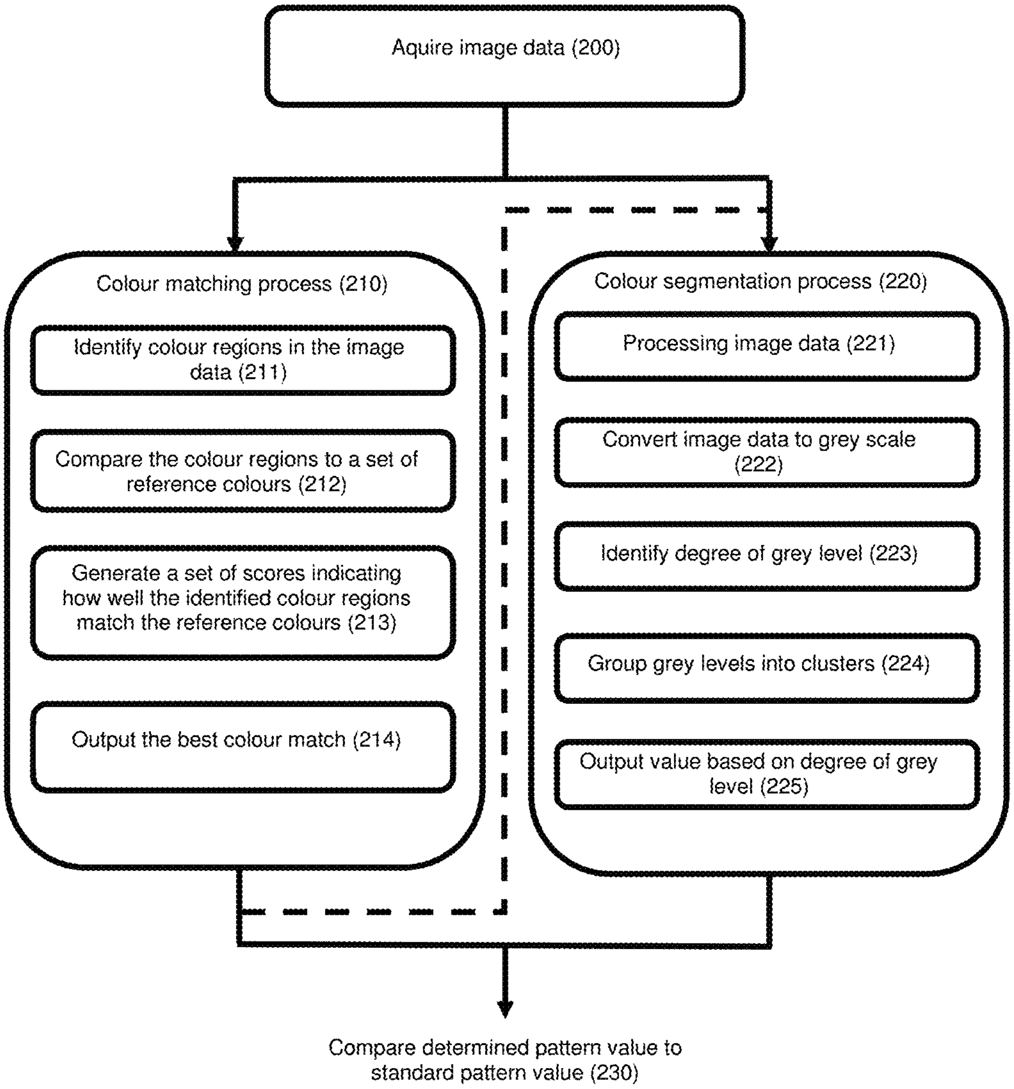
FIG. 2 is a flowchart of determining a pattern value.

FIG. 2 shows a flowchart giving an example of determining a pattern value from the captured image by the processor. First, image data is acquired 200 from the image capturing device and sent to the processor. Subsequently, a colour matching process 210 and an image or colour segmentation process 220 can be performed simultaneously or sequentially as required by the user operating the system 100.

The colour matching process 210 is also referred to as a composite colour matching process and comprises the steps of:

- identifying colour regions in the image data 211;
- comparing the colour regions to a set of reference colours 212;
- generating a set of scores indicating how well the colour regions match the reference colours 213 wherein a higher score translates to a greater degree of similarity; and
- outputting the best colour match from the reference colour based on the colour region derived from the image data 214.

Herein, the colour matching process 213 uses a simple distance algorithm to match colours based on the distance in colour space between each colour in the colour region and each colour in the set of reference colours.

In process 220, the processor 120 performs an image or colour segmentation process wherein it captures, processes, and converts image data into a grey scale image comprising light pixels against a dark background. The light pixels correspond to the features of the colour input that fall into one or more colour ranges specified either in the set of reference colours, colours determined by the user, or stored colour values or patterns. The image or colour segmentation process comprises the steps of:

- processing the image data 221;
- converting the image data into a grey scale image 222;
- identifying the degrees of grey level in the converted grey scale image 223;
- grouping the degrees of grey levels into clusters 224; and
- outputting a statistical value based on the degree of grey level for each cluster 225.

The colour segmentation process 220 can also be referred to as an image segmentation process wherein the image is partitioned or segmented into multiple parts, collection of regions of pixels, or regions based on the characteristics of the pixels in the image. The image segmentation process may comprise separating the foreground from the background, or clustering regions of pixels based on similarities in colour, pattern, shape, gloss level, hue, saturation, matte level, or combinations thereof. For example, the image segmentation process can be used to detect sheen level, degree of tactile features, gradient magnitude, or digital printing errors such as stains, smudges, non-synchronized embossing, irregular gloss or matte levels, or colour mismatch. After both processes 210, 220 are performed, the processing module 120 determines the pattern value and compares it to a standard pattern value 230.

Preferably, the digital printing colour checking system 100 can be deployed in any part of the production process such as during printing, laminating, and/or finishing process wherein the said system 100 can be used to check at least one parameter of a visible surface of a floor/wall/ceiling panel if the said parameter adheres to test standards or within the acceptable ranges. The said visible surface of the floor/wall/ceiling panel may include, but is not limited to, the topmost surface of the top layer, the wear layer, the coating layer, the surface of the locking mechanism such as the click, a male or female part, coupling part, inclined surfaces, chamfer, bevels such as painted bevels, enhanced bevels, imitation grout lines, embossed portions, surfaces of cavities underneath the core layer or the backing layer, impressed cavities, exposed portions of the core layer, bottommost surface of the panel, cross-sectional portion of the panel, décor layer as can be seen through a transparent wear layer, any visible surface of a floor/wall/ceiling panel, or combinations thereof.

In another embodiment, the system 100 can also be deployed to check each layer of the floor/wall/ceiling panel before being adhered with each other wherein the layers can be, but is not limited to, at least one wear layer, coating layer, décor layer, adhesive layer, adhesive layer, film layer, mesh layer, reinforcing layer, core layer, acoustic layer, compressible layer, balancing layer, cellulose layer, ink-accepting layer, rigid top layer, cushioning layer, honeycomb layer, bottom layer, cork layer, or any other layer that can be used in a floor/wall/ceiling panel.

In a preferred embodiment, the digital printing colour checking system 100 can be used to control the printing process such as analog printing process like a rotary printing process, staining process, painting process, or more preferably a digital printing process including any related printing processes. When used in combination with the digital printing process, the system 100 provides a feedback loop to adjust the colour application of the digital printer based on environmental parameters such as relative humidity and temperature which also cause some impact on the production parameters.

In another preferred embodiment, the digital printing colour checking system 100 can be used to control or be combined with the laminating process such as thermal lamination, extrusion, hot/cold pressing, glue pressing, or combinations thereof.

In another embodiment, the digital printing colour checking system 100 is deployed in finishing processes such as but is not limited to coating, treating, and bevel painting processes. The coating process includes the conventional coating processes including but is not limited to UV, electron beam coating, excimer, LED, or combinations thereof. The treating process may include processes such as but is not limited to oiling, smoking, sanding, other similar processes, or combinations thereof. In this application, the system 100 is used as a quality checking step to validate the adherence of the panel parameters on the standard quality values. The system 100 can then check if the bevel, for example, has the correct colour values or other parameters such as the correct gloss level, patterns, matte levels, or even size.

Figure 3A:
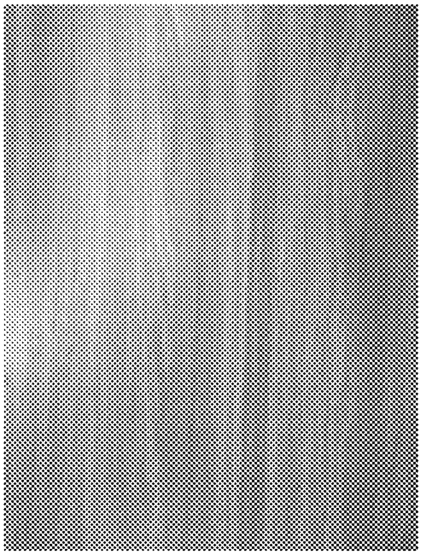
FIG. 3A is a captured image of a panel.
Figure 3B:
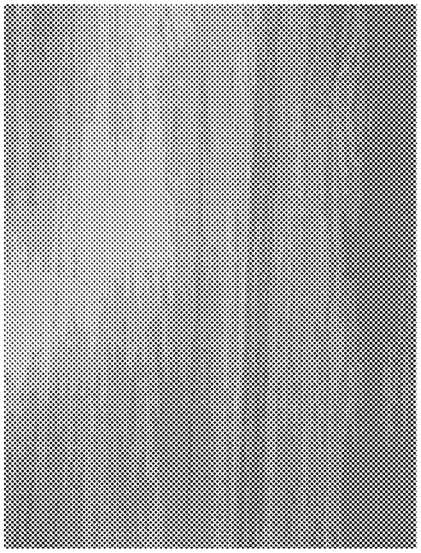
FIG. 3B is a simplified image of the image of FIG. 3*a*.

In a preferred embodiment, the at least one captured image is processed and converted to a simplified image. An example of such a captured image is shown in FIG. 3*a* and the corresponding simplified image is shown in FIG. 3*b*. Then the n dominant colours are determined which can are expressed in HEX values or more preferably in Lab values. The dominant colours of the simplified image as shown in FIG. 3*b* and their corresponding percentage with respect to the total image are given in the table below.

| Hex colour code | Percentage of total image |
|---|---|
| #a09d91 | 25.89 |
| #928e82 | 23.96 |
| #b1aea5 | 19.89 |
| #827c71 | 16.51 |
| #c1c0bc | 13.75 |

Figure 3C:
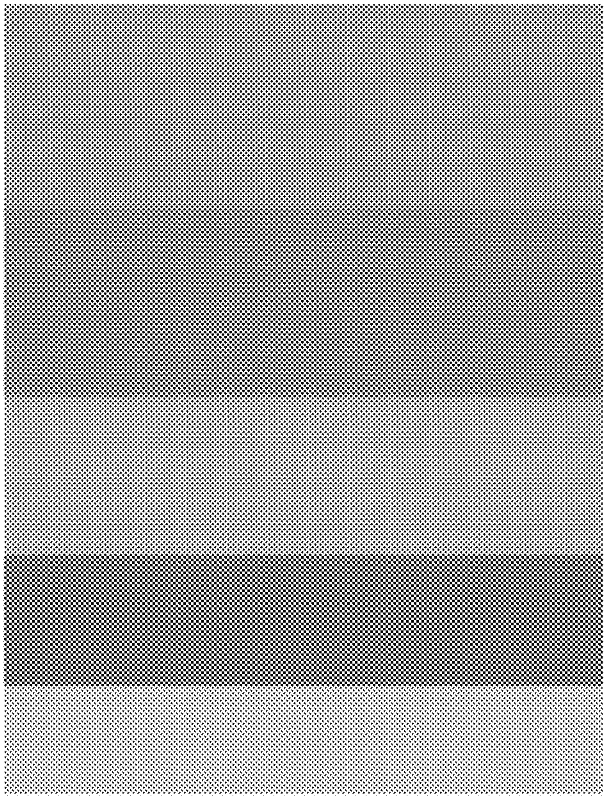
FIG. 3C is a palette of the different colours of the image in FIG. 3*b*.

Moreover, the percentages for each of the dominant colours are presented in FIG. 3*c* as a dominant colour palette. The percentages represent how much of the dominant colour is present in the captured image. In some preferred embodiments, acceptable range of values/thresholds/tolerances are defined for each of the dominant colours such as, for example, +1% to +5%. In line with this, the digital printing colour checking system 100 may further comprise a means for rejecting panels that do not pass the defined standards. If, for example, the acquired image of a panel comprises a delta L value of greater than 0.5, then the system 100 through an eject module will remove the faulty or defective panel. The system 100 can also provide the reason of this removal via a feedback loop wherein the system 100 will send a feedback signal to a digital printing system, for example, indicating the parameter that causes the defect in the panel. Upon receiving the feedback signal, the digital printing system automatically adjusts at least one digital printing parameter as a corrective measure to avoid the said defect or error in the next printing process.

The invention will be elucidated on the basis of the following non-limitative clauses.

1. Method for determining a pattern deviation value of a top surface of a panel, in particular a top surface of a floor panel or wall panel, comprising the steps of:
   a) providing at least one panel having a top surface;
   b) providing at least one database comprising a plurality of standard pattern values of the panel;
   c) selecting at least one standard pattern value from the database;
   d) capturing at least one image of at least part of the panel,
   e) determining at least one pattern value of at least part of the image; and
   f) calculating a pattern deviation value based upon the at least one pattern value determined during step e) and/or the at least one standard pattern value selected during step c).
2. Method according to clause 1, further comprising the step of rejecting the panel if the pattern deviation value exceeds a threshold value.
3. Method according to clause 1 or clause 2, wherein the at least one pattern deviation value is a colour deviation value representable in a colour space selected form HSV, HSL, CMY, CMYK, CRYK, Lab, and RGB.
4. Method according to any of clauses 1-3, wherein the plurality of standard pattern values and the at least one pattern value each comprise an L*-value, an a*-value, and/or a b*-value, wherein L* is a lightness value, ranging from 0-100, a* is an unbounded red-green value, and b* is an unbounded blue-yellow value, wherein a* and b* preferably range from −128-127.
5. Method according to any of clauses 1-4, wherein in step d) at least 50% of the top surface of the panel is captured, preferably at least 75%, or more preferably at least 90%.
6. Method according to any of clauses 1-5, wherein in step e) at most 50% of the captured image is used to determine the at least one pattern value, preferably at most 25%, more preferably at most 10%, most preferably at most 5%.
7. Method according to any of clauses 1-6, comprising the step of determining at least one dominant colour region of the image captured during step d), and wherein the at least one pattern value determined during step e) comprises at least one colour value of the dominant colour region.
8. Method according to any of clauses 1-7, wherein the at least one pattern value determined during step e) comprises an average colour value, at least one dominant colour value, and/or a ratio of a plurality of dominant colour values.
9. Method according to any of clauses 1-8, wherein the pattern deviation value is a geometric mean difference value.
10. Method according to clause 9, wherein the threshold value is 1, preferably 0.75, more preferably 0.5.
11. Method according to any of clauses 1-10, wherein in step d) the top surface of the panel is illuminated with blue light, red light, or a combination thereof.
12. Method according to clause 11, wherein the blue light has a wavelength between 460-500 nm and the red light has a wavelength between 620 and 720 nm.
13. Method according to any of clauses 1-12, wherein in step d) at least one image of a digitally printed surface of the panel is captured.
14. Method according to any of clauses 1-13, wherein the method is performed at a plurality of time intervals during production of a plurality of panels; and wherein at each time interval the method is performed for at least one panel.
15. Method according to any of clauses 1-14, wherein the method is performed during application of a design on at least one panel surface, during a lamination process, and/or during a finishing process.
16. Method according to any of clauses 1-15, wherein the calculated pattern deviation value is fed back to a printer and wherein a pattern printed by the printer on a panel is adjusted based on the calculated pattern deviation value.
17. System for determining a pattern deviation value of a top surface of a panel, in particular via a method according to any of clauses 1-16, comprising:
   at least one image capturing device;
   at least one database comprising a plurality of standard pattern values of the panel; and
   at least one processor configured to select at least one standard pattern value from the database and to determine at least one pattern value of at least part of an image obtainable by the at least one image capturing device, and subsequently calculating a pattern deviation value based upon the at least one determined pattern value and the at least one selected standard pattern value.
18. System according to clause 17, wherein the at least one image capturing device is a camera.
19. System according to clause 17 or clause 18, comprising at least one panel holder for receiving at least part of at least one floor panel or wall panel.
20. System according to clause 19, comprising at least one controller connected to the at least one image capturing device, wherein the at least one controller is configured to position the at least one image capturing device relative to the at least one panel holder.
21. System according to any of clauses 17-20, comprising a light source for illuminating at least part of the panel.
22. System according to clause 21, wherein the light source comprises a plurality of light sources, preferably wherein the plurality of light sources is able to emit light with different wavelengths.
23. System according to clause 21 or 22, wherein a position of the light source relative to the at least one image capturing device is adjustable.
24. System according to any of clauses 17-23, comprising a motion detector for detecting positional changes of the at least one image capturing device relative to the panel and/or the at least one panel holder.
25. Panel, in particular a floor panel or wall panel, comprising a pattern deviation value below 10%, preferably below 5%, calculated via a method according to any of clauses 1-16 and/or determined via a system according to any of clauses 17-24.
26. A plurality of panels, in particular a plurality of floor panels and/or wall panels, wherein each panel of the plurality of panels comprises a pattern deviation value preferably below 10%, more preferably below 5%, calculated via a method according to any of clauses 1-16 and/or determined via a system according to any of clauses 17-24.
27. Panel according to clause 25 or a plurality of panels according to clause 26, wherein each panel is digitally printed.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. A method for determining a pattern deviation value of a top surface of a floor panel or wall panel, comprising the steps of:

a) providing at least one panel having a top surface;

b) providing at least one database comprising a plurality of standard pattern values of the panel;

c) selecting at least one standard pattern value from the database;

d) capturing at least one image of at least part of the panel, e) determining at least one pattern value of at least part of the image, wherein the top surface of the panel is illuminated with blue light, red light, or a combination thereof, and f) calculating a pattern deviation value based upon the at least one pattern value determined during step e) and the at least one standard pattern value selected during step c)

wherein after step d), at least one dominant colour region of the at least one image captured is determined, wherein the at least one pattern value in step e) comprises at least one colour value of the dominant colour region, wherein the pattern deviation value is a geometric mean difference value, and wherein a threshold value for the pattern deviation value is 1 or lower.

2. The method according to claim 1, further comprising the step of rejecting the panel if the pattern deviation value exceeds a threshold value.

3. The method according to claim 1, wherein the at least one pattern deviation value is a colour deviation value representable in a colour space selected form HSV, HSL, CMY, CMYK, CRYK, Lab, and RGB.

4. The method according to claim 1, wherein the plurality of standard pattern values and the at least one pattern value each comprise an L*-value, an a*-value, and/or a b*-value, wherein L* is a lightness value, ranging from 0-100, a* is an unbounded red-green value, and b* is an unbounded blue-yellow value, wherein a* and b* range from −128-127.

5. The method according to claim 1, wherein in step d) at least 50% of the top surface of the panel is captured.

6. The method according to claim 1, wherein in step e) at most 50% of the captured image is used to determine the at least one pattern value.

7. The method according to claim 1, wherein the at least one pattern value determined during step e) comprises an average colour value, at least one dominant colour value, and/or a ratio of a plurality of dominant colour values.

8. The method according to claim 7, wherein the blue light has a wavelength between 460-500 nm and the red light has a wavelength between 620 and 720 nm.

9. The method according to claim 1, wherein the threshold value for the pattern deviation value is 0.75 or 0.5.

10. The method according to claim 1, wherein in step d) at least one image of a digitally printed surface of the panel is captured.

11. The method according to claim 1, wherein the method is performed at a plurality of time intervals during production of a plurality of panels; and wherein at each time interval the method is performed for at least one panel.

12. The method according to claim 1, wherein the method is performed during application of a design on at least one panel surface, during a lamination process, and/or during a finishing process.

13. The method according to claim 1, wherein the calculated pattern deviation value is fed back to a printer and wherein a pattern printed by the printer on a panel is adjusted based on the calculated pattern deviation value.

14. A system for determining a pattern deviation value of a top surface of a panel via a method according to claim 1, comprising:

at least one image capturing device;

at least one database comprising a plurality of standard pattern values of the panel; and at least one processor configured to select at least one standard pattern value from the database and to determine at least one pattern value of at least part of an image obtainable by the at least one image capturing device, and subsequently calculating a pattern deviation value based upon the at least one determined pattern value and the at least one selected standard pattern value.

15. The system according to claim 14, comprising at least one controller connected to the at least one image capturing device, wherein the at least one controller is configured to position the at least one image capturing device relative to at least one panel holder.

16. The system according to claim 14, comprising a light source for illuminating at least part of the panel, wherein the light source comprises a plurality of light sources, and wherein the plurality of light sources is able to emit light with different wavelengths.

17. The system according to claim 16, wherein a position of the light source relative to the at least one image capturing device is adjustable.

18. The system, according to claim 14, comprising a motion detector for detecting positional changes of the at least one image capturing device relative to the panel and/or at least one panel holder.

19. A floor panel or wall panel comprising a pattern deviation value below 10% determined via the system according to claim 14.

20. A plurality of floor panels and/or wall panels, wherein each panel of the plurality of panels comprises a pattern deviation value below 10% determined via a system according to claim 14.

21. A floor panel or wall panel, comprising a pattern deviation value below 10% calculated via the method according to claim 1.

22. The panel according to claim 21 wherein each panel is digitally printed.

23. A plurality of floor panels and/or wall panels, wherein each panel of the plurality of panels comprises a pattern deviation value below 10%, calculated via a method according to claim 1.

24. The plurality of panels according to claim 23, wherein each panel is digitally printed.

* * * * *